No. 853,120. PATENTED MAY 7, 1907.
W. A. SALTER.
REVERSE GEAR FOR MOTOR VEHICLES.
APPLICATION FILED JAN. 8, 1907.
2 SHEETS—SHEET 1.
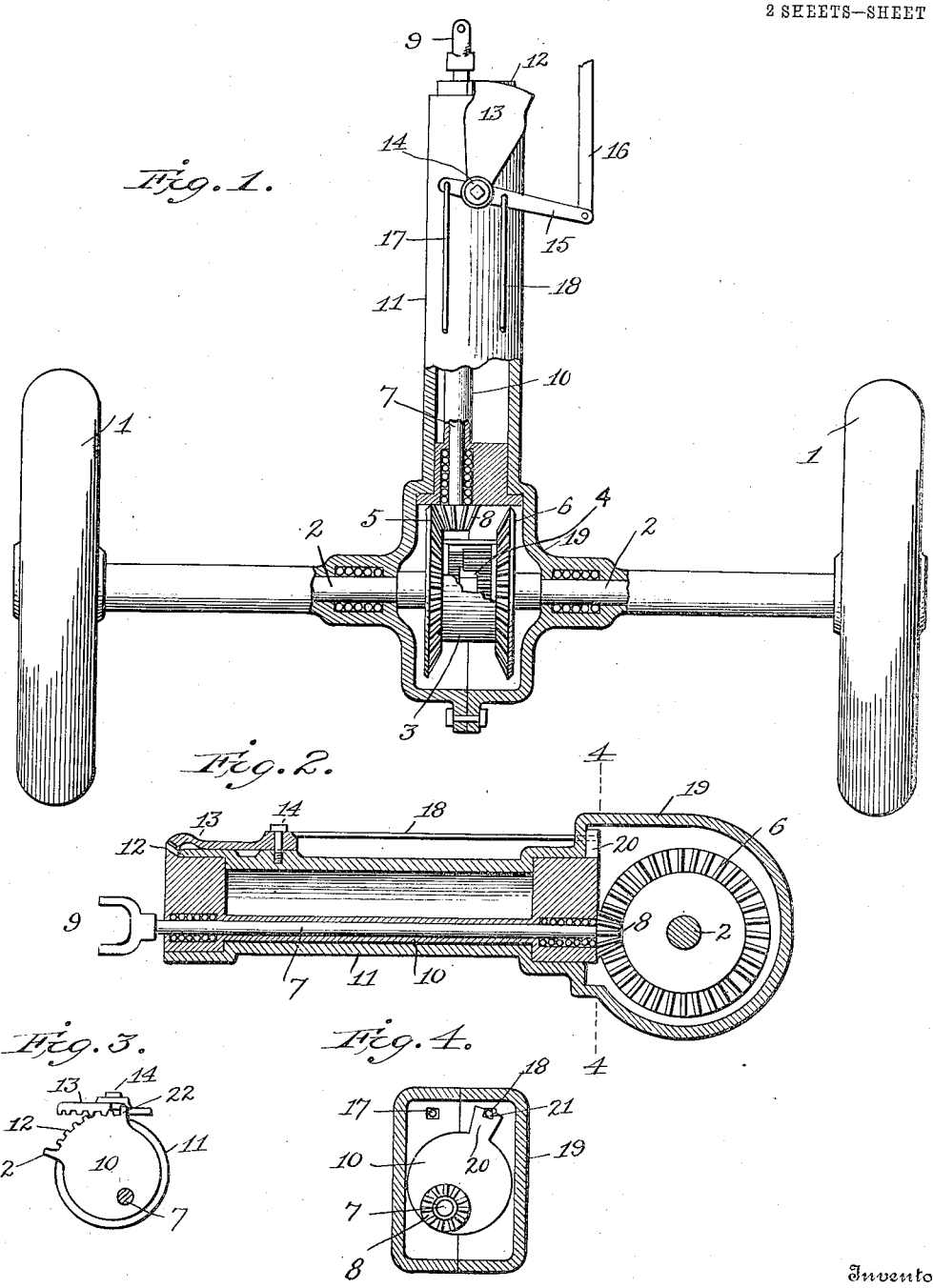

No. 853,120. PATENTED MAY 7, 1907.
W. A. SALTER.
REVERSE GEAR FOR MOTOR VEHICLES.
APPLICATION FILED JAN. 8, 1907.

2 SHEETS—SHEET 2.

Witnesses
Edwin L. Jewell
Wm. E. Dype

Inventor
William A. Salter
By
Attorney

UNITED STATES PATENT OFFICE.

WILLIAM A. SALTER, OF CEDAR POINT, KANSAS.

REVERSE-GEAR FOR MOTOR-VEHICLES.

No. 853,120.　　　Specification of Letters Patent.　　　Patented May 7, 1907.

Application filed January 8, 1907. Serial No. 351,372.

*To all whom it may concern:*

Be it known that I, WILLIAM A. SALTER, a citizen of the United States, residing at Cedar Point, in the county of Chase and State of Kansas, have invented new and useful Improvements in Reverse-Gear for Motor-Vehicles, of which the following is a specification.

This invention relates to reversing gearing for motor vehicles, and its object is to enable the operator to reverse the direction of movement of the vehicle without reversing the motor, so that the latter may always run in the same direction.

Various devices have been heretofore proposed for accomplishing this same result, but my invention contains elements of novelty and simplicity which render it materially different from what has preceded it and constitute a decided improvement in the art.

The invention is applicable only to those motor cars in which a shaft drive is used; that is, in which a shaft driven by the motor runs lengthwise of the vehicle to a point adjacent to the rear axle, where the shaft and axle are connected by bevel gearing. It is customary to make the driving axle in two parts united by a differential gearing or "jack-in-the-box". The rotatable casing in which this gearing is housed is provided with an external bevel gear which meshes with the bevel pinion on the rear end of the motor driven shaft. In my invention, I provide this casing with two bevel gears, facing each other, and the shaft is carried in a bearing or bearings which enable it to be shifted laterally, so that its pinion can be engaged with either one of the bevel gears; the result being that when it is in mesh with one of said gears the vehicle runs forward, while when the pinion is carried over into mesh with the other gear, the vehicle will run backward. In both cases, the differential gearing is used, so that its advantage is not lost, but the device is operative when used with a solid driven shaft also.

Figure 5:
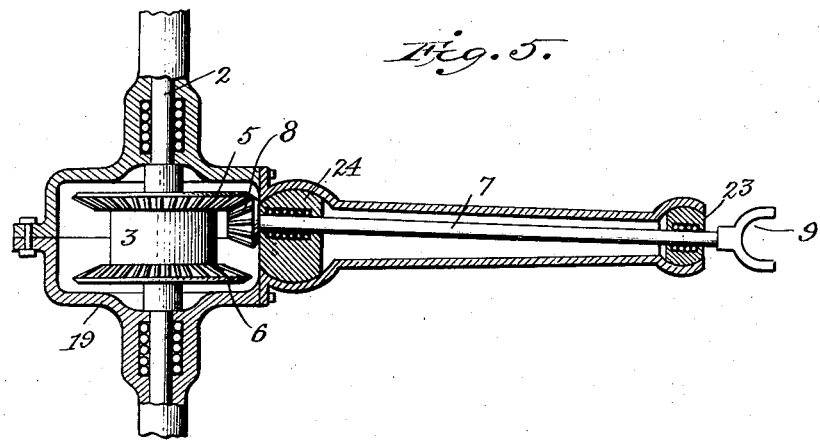
Figure 6:
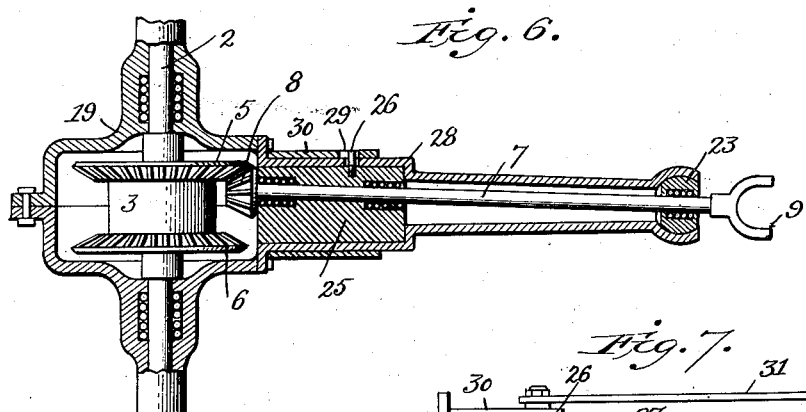
Figure 7:
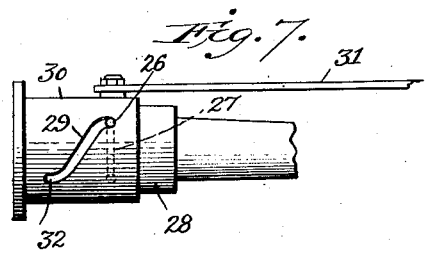
Figure 8:
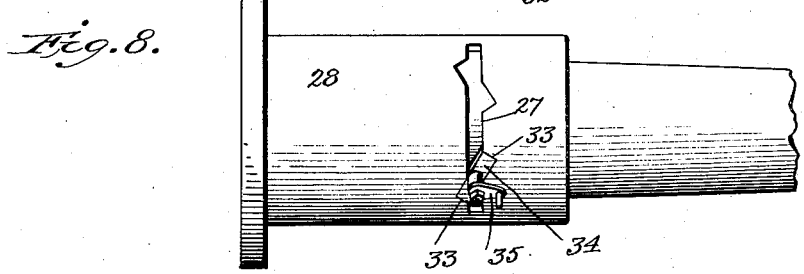

In the accompanying drawings, Figure 1 is a plan view, partly in section, of the rear driving axle and wheels of a motor vehicle, and a portion of the driving shaft and the gearing. Fig. 2 is a longitudinal section through the drive shaft and gearing. Fig. 3 is a view of the left hand end of Fig. 2, the shaft being in section. Fig. 4 is a cross section on the line 4—4, Fig. 2. Fig. 5 is a sectional plan view of a modification. Fig. 6 is a similar view of another modification. Fig. 7 is an elevation of a portion of Fig. 6, and Fig. 8 is an elevation showing another modification.

Referring first to the views on Sheet 1, the driving wheels 1 are shown as mounted on the ends of the divided axle 2, whose abutting ends enter the casing 3 in which is housed the differential gearing 4, of any preferred type. On the outside of the casing are formed or secured the two bevel gears 5, 6, facing each other and preferably of the same size and pitch. The drive shaft 7, which runs lengthwise of the vehicle, carries at its rear end the pinion 8 adapted to mesh with either of the gears 5, 6; the space between said gears being sufficient to prevent said pinion from engaging with both at the same time. The shaft 7 is provided at its front end with a universal joint 9 by means of which it can be flexibly connected with the shaft of the motor.

In order to enable the shaft 7 to be moved laterally so as to bring the pinion into mesh with one or the other of the gears 5, 6, at will, said shaft is preferably journaled in a long bearing in a rotatable element, such as the sleeve 10, which is mounted eccentrically in a cylindrical tube 11 forming preferably a part of the framework supporting these various parts. Since the axle of the shaft is eccentric to that of the sleeve, it follows that when the latter is oscillated in the tube the shaft will be carried from side to side, and the pinion will be meshed with one or the other of the bevel gears, as the case may be.

Various modes of oscillating the sleeve may be devised. In Figs. 1, 2, 3 and 4, I have shown one end of the sleeve provided with a segment gear 12 meshing with a segment gear 13 pivoted at 14 on top of the tube 11 and attached to a lever 15 to which is pivoted a rod 16 running to some point convenient to the operator. Any movement of the lever will cause the segment gear 13 to turn the sleeve in its bearing in the tube, and thus shift the pinion from one bevel gear 5, 6, to the other. In addition to this shifting means, I provide a locking device for relieving the segment gears of all strain after the pinion has been shifted. This consists preferably of two bolts 17, 18, pivoted to the lever 15 on opposite sides of its pivotal point 14 and extending back through holes in the casing 19 which surrounds the gears 5, 6. The rear end of the sleeve 10 has a lug 20 projecting up into the plane of the bolts and having an aperture 21 into which the end of a bolt can enter when said aperture comes in line with it. Just as the sleeve reaches the end of its oscillation, and the pinion is fairly in mesh with its gear, the lug comes in line with one of the bolts, and the latter enters its aperture, so as to prevent any backward movement of the sleeve. To permit this additional movement of the lever 15 required to insure the bolting of the sleeve after it has reached its position, the segment gears are designed to disengage at the proper instant. A long tooth 22 at each end of the segment gear 12 insures the re-engagement of the gear 13 therewith when the reverse movement of the gears is effected.

The arrangement above described causes the shaft 7 to be shifted laterally as a whole, that is, its front end is carried through the same arc as its rear end. In some cases, it may be preferable to shift only the rear end of the shaft, in which event its front end will have to be mounted in a ball and socket bearing, as shown at 23 in Fig. 5. The rear end of the shaft, also may be journaled eccentrically in a ball 24, which can be oscillated by some suitable device to carry the pinion to and fro into engagement with the bevel gears 5, 6.

In lieu of a ball 24, a cylinder 25 may constitute the rotatable element for supporting the rear end of the shaft, the latter passing through said cylinder on a line oblique to its axis, so that when the cylinder is oscillated the shaft will move in a conical path, the apex of which is in the front ball 23. A simple means for oscillating this cylinder is shown in Figs. 6 and 7, and consists of a pin 26 projecting from the cylinder through a slot 27 in the stationary tube 28 and engaging with a diagonal slot 29 in a sleeve 30 mounted upon the tube 28. By means of a rod 31 or the like the sleeve can be slid to and fro, and in so doing it causes the pin 26 to move from end to end of the slot 27 and thus oscillates the cylinder.

If desired, some locking means may be provided for the sleeve; such for instance as the straight portions 32 at the ends of the diagonal slot 29. Or, if preferred, the sleeve may be dispensed with, and the slot 27 may be provided with lateral recesses 33, as shown in Fig. 8, into which the ends of a block 34 can be turned when the pin 26 reaches the end of its travel. The block is pivoted on the pin and is provided with some means for readily turning it, such as the crank arm 35, which can be easily connected with a rod or some equivalent device for actuating it at the same time with the block; the movement of the rod effecting first the turning and unlocking of the block, next the oscillation of the pin in its slot, and finally the turning of the block to relock it at the other end of the slot.

I do not bind myself to the exact construction herein shown, as it is obvious also, that there may be many other means, of the application of this invention, and which means may be classed as the equivalent thereto, both in the shifting and the locking of the bevel pinion into engagement with the two facing bevel gear wheels secured to the differential gear casing. Of the various means by which this result may be obtained, however, I consider the driving shaft, journaled eccentrically within a circular rotatable journal as the best, as it admits of economical manufacture, and very accurate and durable construction, coupled with rigidity in operation, and maintaining of exact lines in the pitch of the gearing between the bevel wheel members, when in engagement, thus insuring even wear and easy running. But any other means for shifting the driving shaft laterally and locking it into position as described, so as to be the equivalent hereto, also comes within the scope of this invention, and is claimed.

Having thus described my invention, what I claim is:—

1. In a reverse gear, the combination with a divided shaft, of a casing, differential gearing therein connecting the ends of the two portions of said shaft, two bevel gears secured to said casing and facing each other, a driving bevel pinion adapted to mesh with either of said gears, and connected means for shifting said pinion into engagement with either of said gears, and for locking it in such position.

2. In a reverse gear, the combination with a divided shaft, of a casing, differential gearing therein connecting the ends of the two portions of said shaft, two bevel gears secured to said casing and facing each other, an element rotatable on an axis transverse to said shaft, a drive shaft journaled eccentrically in said rotatable element, and a pinion on said drive shaft adapted to be engaged with either of said gears, when said element is rotated, and connected means for rotating and locking said element.

3. In a reverse gear, the combination with a divided shaft, of a casing, differential gearing therein connecting the ends of the two portions of said shaft, two bevel gears secured to said casing and facing each other, a tube extending at right angles to said shaft, a sleeve rotatable in said tube, a drive shaft journaled eccentrically in said sleeve, a pinion on said drive shaft adapted to mesh with either of said gears, means for oscillating said sleeve comprising two gears, one on said sleeve, a hand lever connected with the other, and a locking device actuated by said hand lever.

4. In a reverse gear, the combination with a divided shaft, of a casing, differential gearing therein connecting the ends of the two portions of said shaft, two bevel gears secured to said casing and facing each other, a tube extending at right angles to said shaft, a sleeve rotatable in said tube, a drive shaft journaled eccentrically in said sleeve, a pinion on said drive shaft adapted to mesh with either of said gears, means for oscillating said sleeve, and locking bolts moving with said oscillating means and engaging with said sleeve.

In testimony whereof I have signed my name to this specification in the presence of two subscribing witnesses.

WILLIAM A. SALTER.

Witnesses:
MATIE A. SALTER,
JOHN B. HANNA.